United States Patent [19]

Van de Venter

[11] Patent Number: 5,154,834
[45] Date of Patent: Oct. 13, 1992

[54] DISINFECTION BY-PRODUCTS REMOVAL IN WATER PURIFICATION

[75] Inventor: Larry W. Van de Venter, Burlington, Mass.

[73] Assignee: Infilco Degremont Inc., Richmond, Va.

[21] Appl. No.: 667,655

[22] Filed: Mar. 11, 1991

[51] Int. Cl.$^5$ ............................ C02F 1/28; C02F 1/56
[52] U.S. Cl. ........................... 210/666; 210/679; 210/694; 210/715; 210/735; 210/908
[58] Field of Search ............... 210/691, 694, 728, 729, 210/730, 732, 733, 734, 735, 908, 909, 915, 715, 666, 679

[56] References Cited

U.S. PATENT DOCUMENTS

| | | | |
|---|---|---|---|
| 4,549,966 | 10/1985 | Beall | 210/909 |
| 4,661,259 | 4/1987 | Walterick, Jr. et al. | 210/728 |
| 4,737,293 | 4/1988 | Walterick, Jr. et al. | 210/728 |
| 4,765,908 | 8/1988 | Monick et al. | 210/728 |

*Primary Examiner*—Stanley S. Silverman
*Assistant Examiner*—Neil M. McCarthy
*Attorney, Agent, or Firm*—Carroll F. Palmer

[57] ABSTRACT

Improved methods for removal of disinfection by-products, halomethanes, precursors thereof and other organic contaminants from water being processed for use as potable or industrial water involve adding to the water being treated in a zone separate from the conventional clarification, softening and filtration steps, and downstream of at least the clarification step, between about 1 to 1000 ppm of powdered activated carbon (PAC), between about 1 to 1000 ppm of bentonite and between about 0.1 to 100 ppm of flocculant polymer, based upon one million parts of the water. The relative proportions of PAC, bentonite and polymer within the stated ranges are selected to give a sludge having a sludge cohesion factor "k" between about 0.5 and 5, especially between 0.6 and 1.5.

10 Claims, No Drawings

DISINFECTION BY-PRODUCTS REMOVAL IN WATER PURIFICATION

BACKGROUND OF THE INVENTION

1. Field of the Invention

This application relates to methods for the purification of water. More particularly, it concerns improvements in the removal of disinfection by-products, especially halomethanes, precursors thereof and related organic compounds, during the purification of water for potable or industrial uses.

2. Description of the Prior Art

Disinfection by-products (DBP), exemplified by halomethanes, particularly trihalomethane content, of potable water has acquired a status of critical concern due to alleged carcinogenic properties of such compounds. As a result, the threshold quantity of such substances, labeled THM compounds, that may be present in potable waters are now controlled by a variety of governmental regulations, e.g., the 1986 Amendments to the Safe Drinking Water Act. Hence, in water purification operations, effluent water from water treatment plants must meet strict requirements on THM content and such plants require procedures capable of efficiently removing halomethanes and precursors thereof to enable their output of water to meet prescribed restrictions on THM content.

The THM restrictions apply to chloroform and a variety of related halomethane compounds, e.g., bromoform, iodoform, dibromochloromethane, bromodichloromethane, etc. Such compounds are believed to be created when THM precursors, e.g., ethanol, acetone, methyl ketone, humic acid, fulvic acid, acetaldehyde, etc. are present in water undergoing chlorination or contact with other halogen during a water purification operation, e.g., disinfection. Of the various percursors, the low molecular weight (LWM) fulvic acid type materials are particularly troublesome in conventional potable water purification operations. Thus, in contrast, the high molecular weight (HWM) humic acid type materials are more easily removed in first-stage conventional clarification processes using alum or iron salts. However, the LMW fulvic acid THM percursors are much more difficult to remove via conventional clarification procedures. The present invention addresses this problem and provides improved methods for the cost effective removal of fulvic acid, humic acid and related THM percursors that have generally evaded satisfactory removal in prior known potable water purification operations.

Historically the use of powdered activated carbon (PAC) in water treatment is extensive and this has included wastewater treatment as well as potable water treatment. Conventionally, in both cases, PAC has been applied to the headworks of the operation primarily where one equivalent of reaction occurs followed by subsequent clarification and filtration. Usually, the sedimentation or clarification section is designed with many hours of detention time and the solids literally settle as the water passes from one end of a basin to the other. Therefore, the raw water, from the resulting precipitates or flocs as it then proceeds to exit the unit.

With the advent of solids contact sedimentation devices of higher surface loading rates and several cycles of internal recirculation, there has been increased opportunity in adsorption by the applied PAC for contaminants to be removed, e.g., see *Advanced Wastewater Treatment Using Powdered Activated Carbon in Recirculating Slurry Contactor Clarifiers*, U.S. Dept. of Interior, Water Pollution Control Research Series Publication No. ORD-17020 FKB 07/70 by C. F. Garland and R. L. Beebe, Infilco, Tucson, Ariz. In such operations, inorganic coagulation in conjunction with the PAC was required, e.g., see *Evaluation of Organic Removal Options At Newport News, Va.*, Carl Hamann, et al., Second National Conference on Drinking Water Treatment for Organic Contaminants, Edmonton, Alberta, Canada, Apr. 7-8, 1986.

Another example of two-stage PAC treatment was with wastewater treatment plant primary sewage reduction of COD and TOC. Virgin PAC was fed only to the second process unit and the carbon feed to the first unit was slurry obtained from the second stage unit.

In another approach by the prior art to increase the effectiveness of PAC in organic contaminant removal, in particular, THM materials and precursors, mixtures of PAC with a variety of cationic flocculant polymers were added to the influent raw water at a location or locations upstream from softening, clarification and filtration steps in the presence of coagulants, see U.S. Pat. No. 4,737,293.

The present invention further advances the art of the use of PAC for the removal of organic contaminants, particularly, THM compounds and precursors, by the discovery that the efficiency of PAC utilization is critically improved by contacting the water under treatment in a zone separate from softening, clarification and filtration steps downstream from at least the clarification step and not in the presence of potentially fouling coagulants, as in the prior art.

OBJECTS

A principal object of the invention is the provision of improved methods for the purification of water.

Further objects include the provision of:

1. New improvements in the removal of disinfection by-products, typically, halomethanes and precursors thereof, during the purification of water for potable or industrial uses.

2. New methods for the efficient removal of fulvic acid and related THM percursors from influent water in the purification thereof for potable or industrial uses.

3. New methods for the removal of algae by-products, e.g., geosin and methylisoborneol (MIB) organics that contribute to adverse taste and odor from influent water in the purification thereof for potable uses. Also, for the removal of toxic by-products produced by algae.

4. New methods for the removal of industrial waste contaminants, e.g., synthetic organic chemicals (SOCs) from influent water in the purification thereof for potable or non-potable uses.

5. Improved methods for the use of powdered activated carbon (PAC) as an adsorbent for trace organic THM percursors from influent water during purification thereof whereby the PAC is more effectively utilized as compared with its use in prior known related water purification operations.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of improvements in methods for the purification of water for potable or industrial use wherein the water is subjected to conventional clarification, softening and filtration steps.

The new improvements for removal of halomethanes, precursors thereof and other organic contaminants comprise adding to the water being treated in a zone separate from the conventional clarification, softening and filtration steps, between about 1 to 1000 ppm, especially 1 to 50 ppm of powdered activated carbon (PAC), between about 1 to 1000 ppm, especially 1 to 50 ppm, of bentonite and between about 0.1 to 100 ppm, especially 0.1 to 10 ppm, of flocculant polymer, based upon one million parts of the water.

The PAC, bentonite and polymer are mixed with the water to form a sludge blanket of the additives in the water and such sludge blanket is allowed to settle out of the water. Thereafter, supernatant water is removed from the zone. Preferably, the relative proportions of PAC, bentonite and polymer within the ranges stated above should be selected to give a sludge having a sludge cohesion factor (SCF) "k" between about 05. and 5, especially 0.6 and 1.5, as measured by the procedure stated on pages 948–953 of the text entitled Water Treatment Handbook, authored by Degremont and published by Halsted Press, Division of John Wiley & Sons., copyright 1979, the contents of which are incorporated herein by reference.

Powdered activated carbon is a standard commodity of commerce available commercially from a variety of sources.

Bentonite also is a standard commodity of commerce available commercially from a variety of sources.

Flocculant polymers are a know class of materials widely used in water and wastewater treatment operation available commercially from a variety of sources. They are conventionally divided into three separate types, i.e., anionic, non-ionic and cationic.

In preferred embodiments of the invention, the flocculant polymer is cationic quaternary ammonium polymer which may consist essentially of a single such polymer or a mixture of two or more such polymers or a mixture of such polymer with a flocculant anionic polymer or non-ionic polymer. Such polymers are commercially available under the name Cat Floc T TM from Calgon Corporation and Percol 757 TM from Allied Colloids Co. These polymers are discussed in detail in U.S. Pat. No. 4,737,293, the contents of which concerning such polymers is incorporated herein by reference.

Anionic type flocculant polymers are also useable in accordance with the invention. Such polymers are commercially available, for example, under the name Nalco 8182 TM from Nalco Chemical Co., Betz 1100 TM from Betz Laboratories, Inc. and Polytec 34 TM from TECNA Corporation. Typically, this type of polymers are acrylamide/acrylate copolymers in liquid solution form, prepared from solids or gels.

Further, non-ionic type flocculant polymers are also useable in accordance with the invention. Such polymers are commercially available, for example, under the name Nalco 670 TM from Nalco Chemical Co. Typically, this type of polymers are acrylamide polymers in liquid solution form, as solids or gels.

The PAC sludge blankets formed in accordance with the invention when used downstream of any coagulation-clarification process or following any softening-clarification process operate in an environment wherein such blanket encounters substantially only the residual trace organics sought to be removed thereby. Thus, it has been discovered that acting in this manner to avoid presence of fouling precipitants or coagulants, the PAC is utilized with critically improved efficiency in removal of THM compounds, their precursors and other organic contaminants that have heretofore been extremely difficult to eliminate during prior known water purification operations.

DESCRIPTION OF THE PREFERRED EMBODIMENTS

A more complete understanding of the invention can be obtained by reference to preferred embodiments of the invention which are illustrated by the following specific examples of methods of the invention. It will be apparent to those skilled in the art that the examples involve use of some materials and reagents that are commercially available from known sources, e.g., chemical supply houses, so no details are given respecting them.

In the examples, all parts per million (ppm) and percentages are by weight of the total weight of the relevant composition unless otherwise indicated. Also, the water used in the examples (source water) is effluent water from a municipal water purification operation in which influent water obtained from a surface water (river) source was subjected to conventional clarification, and filtration steps. Further, the powdered activated carbon (PAC) used in the examples is commercially available under the tradename Nuchar SA TM from American Norit Corporation and the bentonite used is commercially available under the tradename Accofloc 350 TM.

EXAMPLE 1

A quantity of test stock is prepared by slurrying 10.00 grams of PAC and 10.00 grams of bentonite in 1 liter of source water. This stock is used to charge reaction vessels 1A and 1B so each holds one liter of source water containing 250 milligrams per liter (mg/l) of PAC and 250 mg/l bentonite by pipetting 25 ml of the stock slurry into 975 ml of source water.

EXAMPLE 2

To reaction vessel 1A, there is added 5.0 ppm Cat Floc T TM, a cationic polyquaternary polymer. The contents of vessel 1A are then stirred with a motor driven, propeller-type stirrer operating at 100 rpm for 1 minute and then at 20 rpm for 5 minutes. Finally, the sludge cohesion factor "k" for the resulting suspension is determined using the sludge cohesion test (SCT) previously cited. The value of k is found to be 0.9.

The turbidity of the supernate as determined by the test method 2130B of the American Public Health Association, *Standard Methods For Examination Of Water and Wastewater*, APHA Standard Methods, 17th Ed. 1989 was found to be 0.9 NTU. Also, trihalomethane formation potential (TFP) is tested by APHA method 5710B, aquatid humic substances by method 5510B and fulvic substances by method 5510C.

EXAMPLE 3

The procedure of Example 2 is repeated with reaction vessel 1B, except that 0.25 ppm Betz 1100 ™, an anionic acrylamide/acrylate copolymer, in addition to the 5.0 ppm Cat Floc T ™, is added to the reaction vessel. The k value of the resulting suspension is found to be 4.4 and the supernate turbidity is 0.9 NTU.

EXAMPLE 4

The procedure of Example 1 is repeated using several other stocks containing different amounts of PAC and bentonite to give reaction vessels holding a liter of source water containing suspensions of the following composition:

| Vessel 4A | PAC = 125 mg/l | bentonite = 375 mg/l |
| Vessel 4B | PAC = 375 mg/l | bentonite = 125 mg/l |
| Vessel 4C | PAC = 300 mg/l | bentonite = 200 mg/l |
| Vessel 4D | PAC = 375 mg/l | bentonite = 125 mg/ |
| Vessel 4E | PAC = 125 mg/l | bentonite = 375 mg/l. |

EXAMPLE 5

The procedure of Example 2 is repeated with vessels 4A–4C yielding the following data:

| Vessel 4A k = 1.0 | turbidity = 1.3 NTU |
| Vessel 4B k = 0.1 | turbidity = 0.7 NTU |
| Vessel 4C k = 0.95 | turbidity = 1.1 NTU |

EXAMPLE 6

The procedure of Example 3 is repeated with vessel 4D yielding the following data:

| Vessel 4D k = 1.5 | turbidity = 0.8 NTU |

EXAMPLE 7

The procedure of Example 2 is repeated with vessel 4E except that 12.5 mg/l of Cat Floc T ™ is used instead of 5.0 mg/l. This yields the following data:

| Vessel 4E k = 0.9 | turbidity = 1.0 NTU |

EXAMPLE 8

A reaction vessel 5 is prepared with 1000 ml of source water to which is added 5 mg/l bentonite, 15 mg/l PAC and 5 mg/l Cat Floc T ™. The reaction is carried out in accordance with the procedure of Example 2 for 25 successive cycles. The PAC-bentonite solids (sludge blanket) is retained from each cycle of reaction and combined with 1000 ml of source water with addition of the same dosages of bentonite, PAC and polymer. The turbidity of each cycle of reaction is measured and found to vary from 0.6–1.1 NTU. This resulted in a typical sludge blanket containing 500 mg/l with K=0.9.

EXAMPLE 9

The supernates obtained in Examples 2, 3, 5, 6, 7 and 8 and the source water are tested for disinfection by-products, halomethanes and fulvic acid content using conventional test procedures. The supernate of the source water is found to contain disinfection by-products, halomethanes, humic acid and fulvic acid contents too high to be acceptable under municipal water regulations to produce potable water. The supernates of the remaining vessels 1B, 4A–4E and 5 are all found to have disinfection by-products, halomethanes, humic acid and fulvic acid contents that are acceptable.

The embodiments of the invention in which an exclusive property or privilege is claimed are defined as follows:

1. In a method for the purification of water for potable or industrial use wherein said water is subjected to clarification, softening and filtration steps,
   the improvement for removal of halomethanes and precursors thereof from said water which comprises:
   adding to said water, in a zone separate from said clarification, softening and filtration steps, and at least downstream of said clarification step, between about 1 to 1000 ppm of powdered activated carbon, between about 1 to 1000 ppm of bentonite and between about 0.1 to 100 ppm of flocculant polymer, based upon one million parts of said water,
   the relative proportions of PAC, bentonite and polymer within the ranges stated being selected to give a sludge having a sludge cohesion factor "k" between about 0.5 and 5,
   mixing said additives with said water in said zone to form a sludge blanket of said additives in said water,
   permitting said sludge blanket to settle out of said water in said zone, and
   thereafter removing supernatant water from said zone.

2. In a method for the purification of water for potable or industrial use wherein said water is subjected to clarification, softening and filtration steps,
   the improvement for removing halomethanes and precursors thereof from said water which comprises:
   adding to said water, in a zone separate from said clarification, softening and filtration steps and downstream of at least said clarification and softening steps, between about 10 to 1000 ppm of powdered activated carbon, between about 10 to 1000 ppm of bentonite and between about 0.1 to 100 ppm of flocculant polymer, based upon one million parts of said water,
   the relative proportions of PAC, bentonite and polymer within the ranges stated above being selected to give a sludge having a sludge cohesion factor "k" between about 0.6 and 1.5,
   mixing said additives with said water in said zone to form a sludge blanket of said additives in said water,
   permitting said sludge blanket to settle out of said water in said zone, and
   thereafter removing supernatant water from said zone.

3. In a method for the purification water for potable or industrial use wherein said water is subjected to clarification, softening and filtration steps,
   the improvement for removing halomethanes and precursors thereof from said water which comprises:
   adding to said water, in a zone separate from and downstream of said clarification, softening and filtration steps between about 1 to 1000 ppm of powdered activated carbon, between about 1 to 1000 ppm of bentonite and between about 0.1 to 100 ppm of flocculant polymer, based upon one million parts of said water, the relative proportions of PAC, bentonite and polymer within the ranges stated above being selected to give a sludge having a sludge cohesion factor "k" between about 0.6 and 1.5, mixing said additives with said water in said zone to form a sludge blanket of said additives in said water, permitting said sludge blanket to settle out of said water in said zone, and thereafter removing supernatant water from said zone.

4. The process of claim 1 wherein said flocculant polymer consists essentially of a single flocculant cationic polymer.

5. The process of claim 1 wherein said flocculant polymer consists of a mixture of two or more flocculant cationic polymers.

6. The process of claim 1 wherein said flocculant polymer consists essentially of a mixture of flocculant cationic polymer with a flocculant anionic polymer.

7. The process of claim 6 wherein said anionic polymer is an acrylamide/acrylate copolymer.

8. The process of claim 1 wherein said flocculant polymer consists essentially of a mixture of flocculant cationic polymer with a flocculant non-ionic polymer.

9. The process of claim 8 wherein said non-ionic polymer is an acrylamide polymer.

10. The process of claim 6 wherein said cationic polymer is a cationic quaternary ammonium polymer.

* * * * *